United States Patent [19]

Beinitz et al.

[11] 4,296,356
[45] Oct. 20, 1981

[54] IONIZATION VACUUM GAUGE CIRCUIT

[75] Inventors: Karl Beinitz, Cologne; Joachim Schubert, Wesseling, both of Fed. Rep. of Germany

[73] Assignee: Leybold-Heraeus GmbH, Postfach, Fed. Rep. of Germany

[21] Appl. No.: 102,480

[22] Filed: Dec. 11, 1979

[30] Foreign Application Priority Data

Dec. 13, 1978 [DE] Fed. Rep. of Germany ....... 2853677

[51] Int. Cl.³ .................. G08B 21/00; H05B 37/03
[52] U.S. Cl. ................................ 315/135; 315/107; 315/136; 324/405
[58] Field of Search ............... 315/94, 129, 135, 136, 315/107; 340/640, 652, 653; 324/405, 462; 328/270

[56] References Cited

U.S. PATENT DOCUMENTS

| | | | |
|---|---|---|---|
| 3,141,994 | 7/1964 | Hornfeck et al. | 315/135 X |
| 3,466,534 | 9/1969 | Wallace | 324/405 |
| 3,576,465 | 4/1971 | Harvey | 324/462 X |
| 3,643,247 | 2/1972 | Ratcliffe | 315/135 X |

FOREIGN PATENT DOCUMENTS 2209933 3/1972 Fed. Rep. of Germany ...... 315/135

*Primary Examiner*—Eugene R. LaRoche
*Attorney, Agent, or Firm*—Sprung, Felfe, Horn, Lynch & Kramer

[57] ABSTRACT

In a circuit for an ionization vacuum gauge having a thermionic filament, a control circuit receptive of a control current for controlling the filament and a switch for applying the control current to the control circuit, a circuit is provided for indicating a filament interruption independent of the state of the switch. The circuit includes at least one resistor by-passing the switch to provide a continuous sensing current to the filament and a detector for detecting the interruption in the sensing current and for indicating such an interruption.

9 Claims, 2 Drawing Figures

IONIZATION VACUUM GAUGE CIRCUIT

BACKGROUND

Ionization vacuum gauges, like all electrical vacuum gauges, measure pressure as the particle count density. For this purpose a portion of the molecules or atoms in the gas chamber is ionized. The ions thus produced yield their positive charge to a measuring electrode of the system. The ion current thus produced is an index of the pressure. The ions are formed, as a rule, by electron collision. For this purpose the electrons are emitted by a thermionic cathode.

Since the thermionic cathode of such systems can be operated only at pressures of less than about $10^{-2}$ millibars on account of the fragility of the thermionic emission coating, any defect in the measuring system will not be detected until after a relatively long evacuation process has already been performed. In the case of such a defect, the cell then must be vented for the repair of the gauge, and then the evacuation process must be repeated.

The object of the present invention is to design the power supply circuit of the ionization vacuum gauge such that, whenever the cause of a fault in the gauge system is a break in the thermionic filament, this defect can be detected before the evacuation process begins.

THE INVENTION

This object is achieved in accordance with the invention in that the ionization vacuum gauge circuit comprises elements for indicating a thermionic filament interruption, and for this purpose at least one resistor by-passing the heater current switch is provided for the production of a control current by the filament and an indicator means operated by the control system is provided. Thus it is possible to know the condition of the thermionic filament by means of the indicator without turning on the current to the thermionic filament. In other words, the condition of the gauge can be tested prior to the evacuation process. The danger of having to repeat an evacuation process on account of a defective gauge system is thus eliminated by the invention, at least when a break in the thermionic filament is the cause, as is usually the case.

One simple and particularly practical embodiment of the invention consists in using either the voltage drop on the resistor by-passing the heater current switch or the voltage drop on another resistor in series with the thermionic filament for the operation of the indicator. A circuit of this kind can be realized in a simple manner by providing such that the current flowing in the control circuit will be so small that in no case will it be dangerous or undesirable, and that the heater current will have no influence on the current flowing through the control resistor.

BRIEF DESCRIPTION OF THE DRAWINGS

Additional advantages and details of the invention will be explained with the aid of exemplary circuits represented schematically in FIGS. 1 and 2.

DETAILED DESCRIPTION OF THE INVENTION

Figure 1:
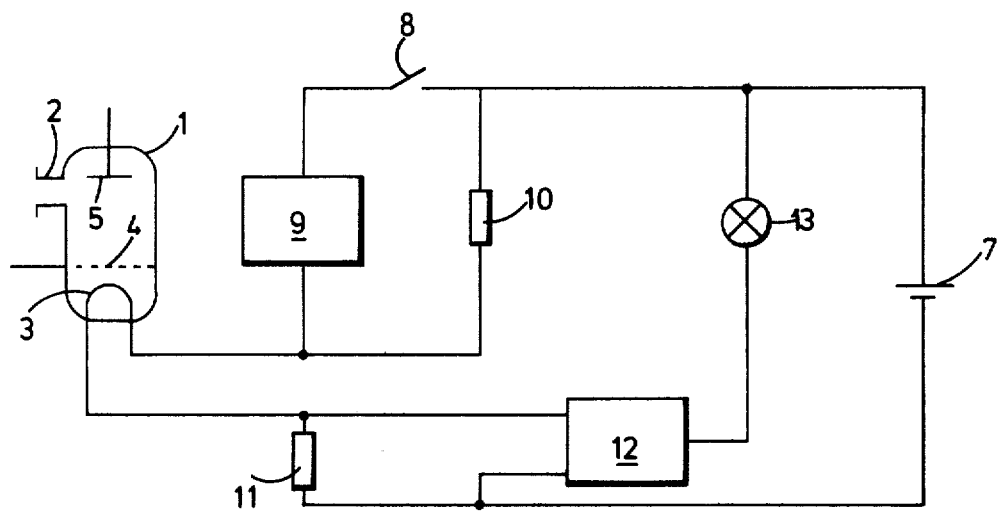
Figure 2:
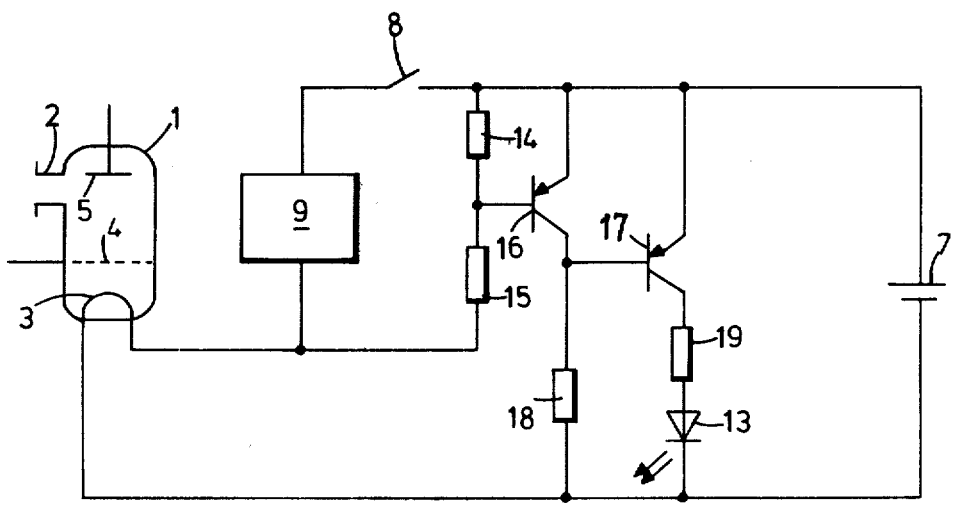

In FIGS. 1 and 2, the gauge tube is identified as 1. By means of the flange connection 2 it is connected to the recipients whose pressure is to be measured or controlled. Also shown are the thermionic cathode formed by the filament 3, and the anode 4 and the ion collector 5.

Of the measuring and power supply circuit of gauge tube 1 only the power supply of the thermionic cathode or filament 3 is shown, which contains the control circuit of the invention. The heater circuit comprises the voltage source 7, the switch 8 for turning the heater current on and off, the thermionic cathode 3, and a control circuit represented as a block 9. With this control circuit the heater current is so regulated that the electron current flowing between the cathode 3 and anode 4 remains constant regardless of the pressure. Since this control circuit is known in itself and is not subject matter of the present invention, it has been represented only in block form. In any case, ionization vacuum gauges are also known which do not have such a control circuit.

In the circuit of FIG. 1, the switch 8 and the control circuit 9, which is used in this case, are by-passed by a resistor 10, so that even when switch 8 is open, a small current will flow through the filament 3 and the resistor 11 connected in series therewith. The magnitude of the current must be selected such that it does not interfere with the rest of the heater circuit. Preferably the control current amounts to a few milliamperes.

By means of an indicator circuit, which is known in itself and is therefore also represented in the form of a block 12, the voltage drop across resistor 11 is detected. Of course, the voltage drop across resistor 10 could also be detected by the indicator circuit 12. The resistor 11 would then be unnecessary. The operation of the indicator element 13 depends on whether or not a voltage drop is present; in the embodiment shown in FIG. 1, the indicator element is a neon lamp. The circuit can be selected, for example, such that, if the thermionic filament is intact, lamp 13 will be on and if it is defective it will be off (or vice versa).

In the case of the embodiment in FIG. 2, the switch 8 and the control circuit 9 are by-passed by two resistors 14 and 15. Between the two resistors there is connected the base of the transistor 16 which is a component of the indicator circuit consisting of the two transistors 16 and 17 and their collector resistors 18 and 19. The indicator element 13 is formed in this embodiment by a light-emitting diode. In the case of a broken filament, the circuit consisting of the voltage source 7, the resistors 14 and 15 and the filament 3 of the gauge tube 1, is interrupted, so that the first transistor 16 is non-conducting and the second transistor 17 is conducting and therefore the light-emitting diode 13 is on. If, however, the thermionic filament is in order, the control current flows through the resistors 14 and 15, and, if the two resistors are properly proportioned, the control current will be sufficient, regardless of the position of the switch 8, to make the first transistor 16 conduct and to make the second transistor 17 non-conducting, so that the light-emitting diode will not turn on.

A special advantage of the circuit of the invention is also to be seen in the fact that only one voltage source is necessary for the production of the heater current and for the production of the control current. As soon as it is in operation it is possible to determine the state of the thermionic filament.

There are a great number of methods of constructing the circuit of the invention. For example, if the circuit has an emission current control, the switch can be in the form of a semiconductor switch (transistor) and can be integrated into the emission current control circuit. It is then desirable for the regulation of the heating current to be performed in the emission control circuit and for the switching of the heater current to be performed by the switch of the same semiconductor element. 9n

What is claimed is:

1. In a circuit for an ionization vacuum gauge having a thermionic filament, a control circuit receptive of current for maintaining a constant current flow between the cathode and anode of the gauge and a switch for applying current to the control circuit, the improvement comprising: circuit means for indicating a filament interruption independent of the state of the switch including at least one resistor by-passing the switch to provide a continuous sensing current to the filament and means for detecting an interruption in the sensing current and for indicating such an interruption.

2. The circuit according to claim 1, wherein the detecting means includes means for sensing the voltage drop across the by-passing resistor.

3. A circuit according to claim 1, wherein the detecting means comprises a second resistor in series with the thermionic filament and means for sensing the voltage drop across the second resistor.

4. A circuit according to claim 1, comprising two resistors by-passing the switch and wherein the means for detecting comprises a transistor having the base connected between the two resistors, a second transistor having its base connected to the collector of the first transistor and wherein the emitters of the two transistors are receptive of the control current and two collector resistors for the two transistors.

5. The circuit according to claim 1 further comprising a single voltage source for the filament current and the control current.

6. The circuit according to claim 1, wherein the indicating means comprises an indicator element including one of a light-emitting diode and neon lamp.

7. The circuit according to claim 1 wherein said at least one resistor by-passes both the switch and the control circuit.

8. The circuit according to claim 1 wherein the switch comprises a semiconductor switch integrated in the control circuit.

9. The circuit according to claim 8, wherein the control circuit comprises only one semiconductor component for the regulation of the filament current and for the switch.

* * * * *